United States Patent [19]
Leonberger

[11] Patent Number: 5,600,497
[45] Date of Patent: Feb. 4, 1997

[54] EXTERNAL REAR VIEW MIRROR FOR VEHICLES, ESPECIALLY MOTOR VEHICLES

[75] Inventor: Karl-Heinz Leonberger, Hochdorf, Germany

[73] Assignee: Reitter & Schefenacker GmbH & Co. KG, Esslingen, Germany

[21] Appl. No.: 212,497

[22] Filed: Mar. 11, 1994

[30] Foreign Application Priority Data

Mar. 12, 1993 [DE] Germany .................. 43 07 821.4

[51] Int. Cl.⁶ .................................................. B60R 1/06
[52] U.S. Cl. ................... 359/875; 359/876; 359/882; 248/481; 248/484; 248/567; 248/603
[58] Field of Search .................... 359/844, 871, 359/872, 873, 874, 875, 876, 882; 248/479, 481, 484, 487, 567, 476, 483, 485, 603, 604, 614

[56] References Cited

U.S. PATENT DOCUMENTS

| | | | |
|---|---|---|---|
| 4,783,161 | 11/1988 | Shamoto | 359/875 |
| 4,856,886 | 8/1989 | Polzer et al. | 359/875 |
| 5,050,977 | 9/1991 | Platzer et al. | 359/866 |
| 5,177,642 | 1/1993 | Wakimoto | 359/844 |
| 5,182,676 | 1/1993 | Iwai et al. | 359/841 |
| 5,383,057 | 1/1995 | Kimura et al. | 359/841 |

FOREIGN PATENT DOCUMENTS

| | | | |
|---|---|---|---|
| 292147 | 11/1988 | European Pat. Off. | 359/871 |
| 1566955 | 5/1969 | France | 359/872 |
| 0278445 | 12/1986 | Japan | 359/875 |

*Primary Examiner*—Paul M. Dzierzynski
*Assistant Examiner*—John Juba, Jr.
*Attorney, Agent, or Firm*—Robert W. Becker & Associates

[57] ABSTRACT

An external rearview mirror for motor vehicle has a housing and a mirror support plate connected in the housing so as to be pivotable about two axes perpendicular to one another. A pivot joint is connected to the mirror support plate for pivoting the mirror support plate. An actuating lever for pivoting the mirror support plate is provided. Two push rods are pivotably connected with a first end to the mirror support plate at a distance from the pivot joint. An intermediate lever is pivotably connected to the actuating lever and to the push rods. The intermediate lever has a transverse rod with two ends in the form of bearing balls. The push rods have at a second end thereof a bearing cup, wherein each bearing ball of the transverse rod rests in one of the bearing cups.

28 Claims, 9 Drawing Sheets

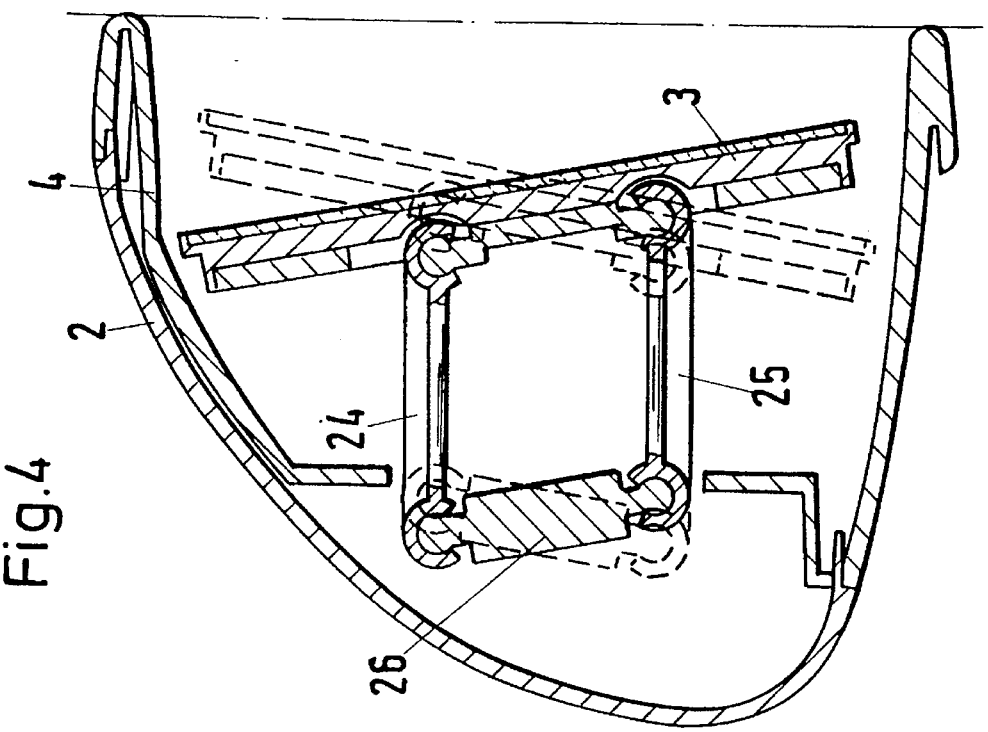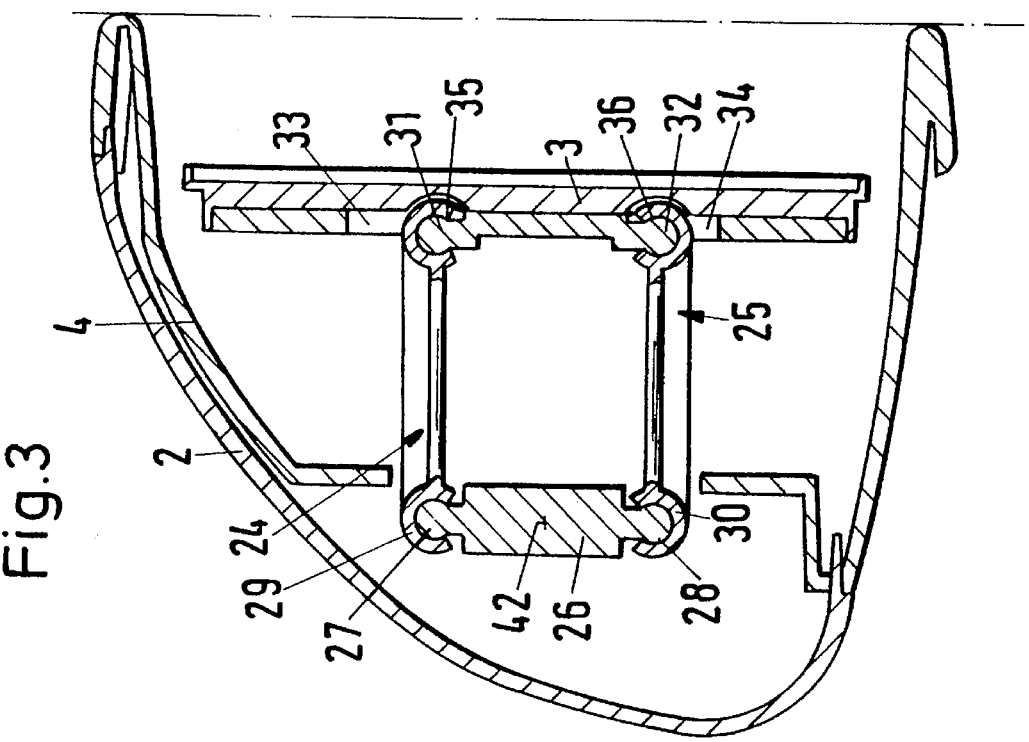

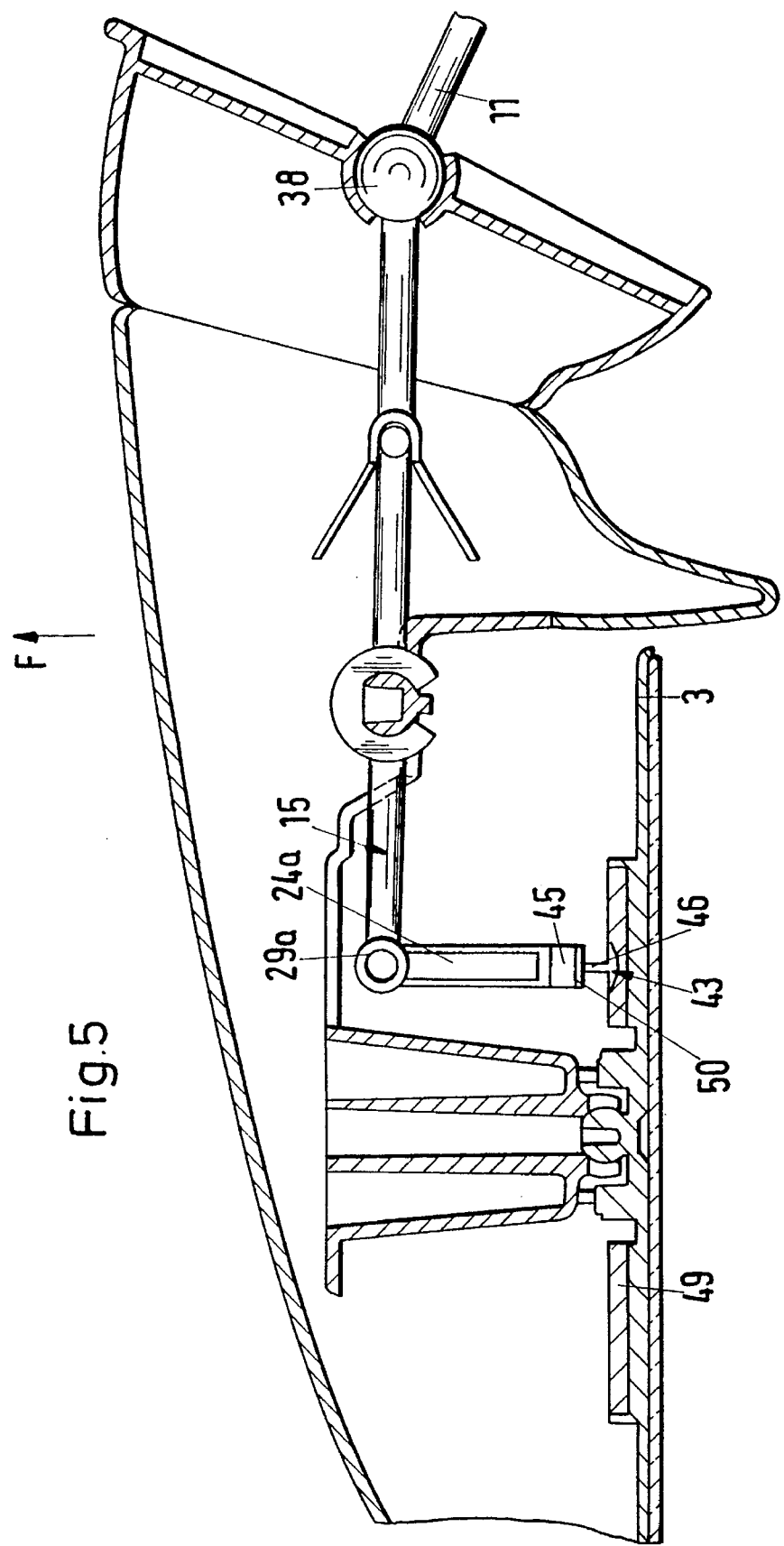

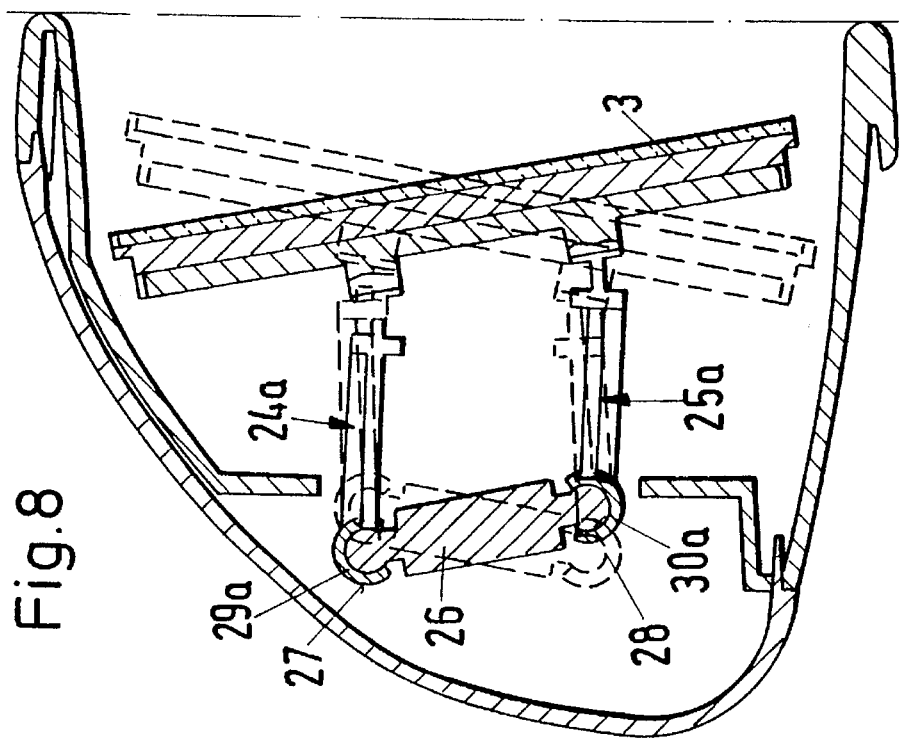
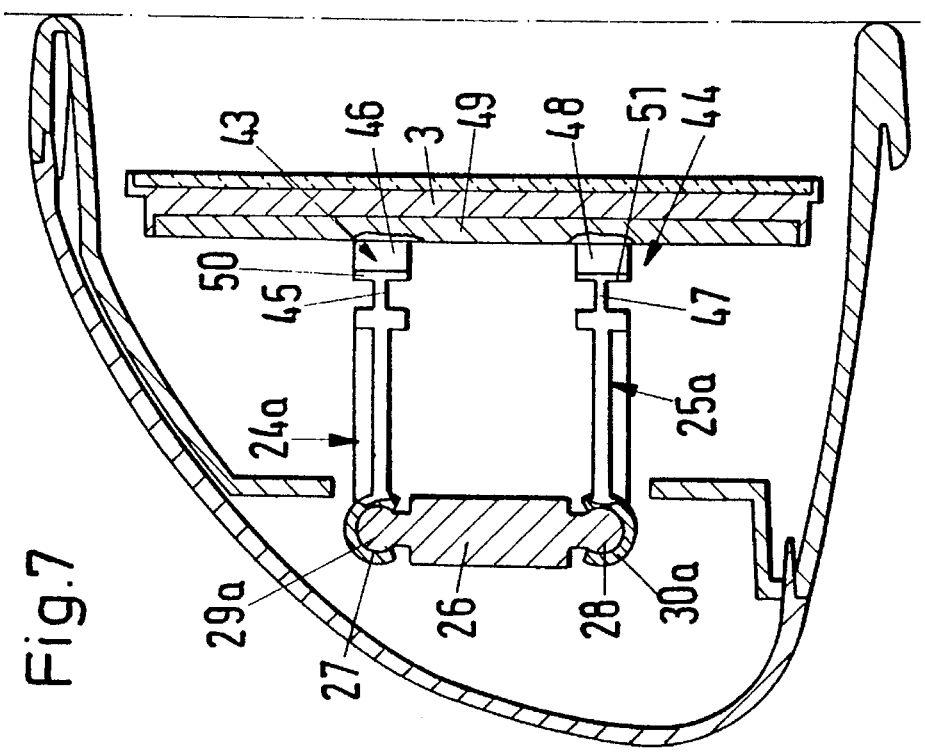

EXTERNAL REAR VIEW MIRROR FOR VEHICLES, ESPECIALLY MOTOR VEHICLES

BACKGROUND OF THE INVENTION

The present invention relates to an external rear view mirror for vehicles, preferably motor vehicles, having a housing in which a mirror support plate is pivotable with the aid of an actuating lever about two axes that are perpendicular to one another, which actuating lever is pivotably connected with an intermediate lever that in turn is pivotably connected with two push rods to the mirror support plate which is supported on a pivot joint positioned at a distance from the connecting location of the push rods at the mirror support plate.

In this known external rear view mirror the push rods at one end are provided with bearing balls and at the other end with a ball receiving means. The push rods are connected with the bearing balls to a corresponding bearing receiving means at the backside of the mirror support plate, while the ball receiving means at the other end of the push rod receive a bearing ball of an intermediate lever. By rotating and pivoting the actuating lever the push rods are correspondingly displaced so that the mirror support plate can be pivoted at the respective pivot joint into the desired position about pivot axes that are perpendicular to one another. This displacing device is constructively complicated, requires furthermore considerable assembly expenditures, and is correspondingly expensive.

It is therefore an object of the present invention to embody the inventive exterior rear view mirror such that it can be manufactured inexpensively and assembled in a simple manner while having a constructively simple design.

BRIEF DESCRIPTION OF THE DRAWINGS

This object, and other objects and advantages of the present invention, will appear more clearly from the following specification in conjunction with the accompanying drawings, in which:

FIG. 3 shows a longitudinal section of the external rear view mirror according to FIG. 1;

FIG. 4 shows in a representation corresponding to FIG. 3 the external rearview mirror with the mirror support plate pivoted about a horizontal axis;

FIGS. 5 to 8 show representations corresponding to FIGS. 1 to 4 of a second embodiment of the inventive external rearview mirrors.

SUMMARY OF THE INVENTION

Figure 1:
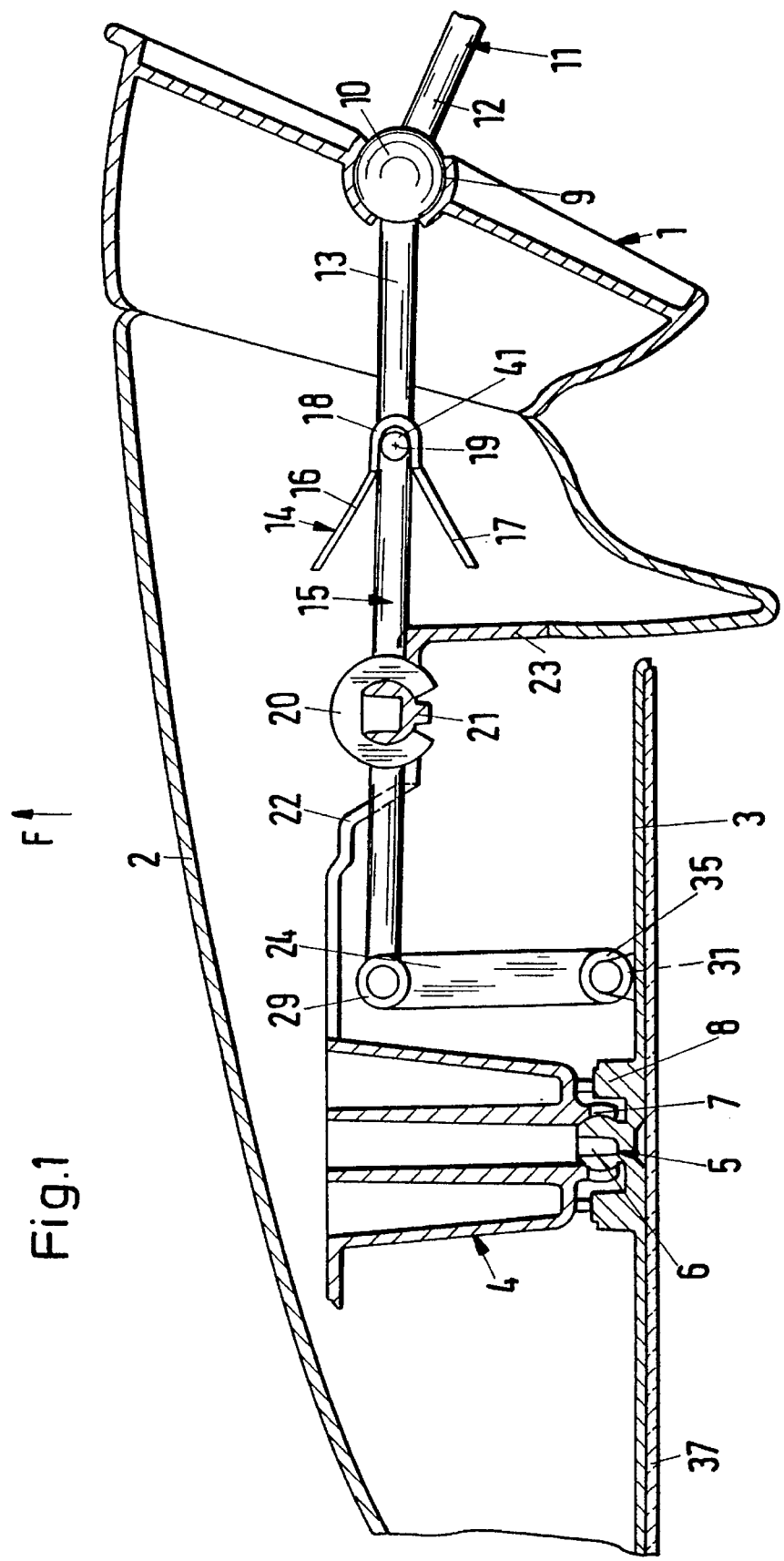
FIG. 1 shows a cross-section of a first embodiment of the inventive external rear view mirror with the mirror support plate in a central position.

The external rearview mirror for a motor vehicle according to the present invention is primarily characterized by:

A housing;

A mirror support plate connected in the housing so as to be pivotable about two axes perpendicular to one another;

A pivot joint connected to the mirror support plate for pivoting the mirror support plate;

An actuating lever for pivoting the mirror support plate;

Two pushrods pivotably connected with a first end to the mirror support plate at a distance from the pivot joint;

An intermediate lever pivotably connected to the actuating lever and the push rods;

The intermediate lever having a transverse rod with two ends in the form of a bearing ball; and The push rods having at a second end thereof a bearing cup, with each of the bearing balls resting in one of the bearing cups.

Preferably, the transverse rod is connected to an end of the intermediate lever opposite the actuating lever.

Advantageously, the intermediate lever has two arms and a ball joint for connecting the two arms to one another.

Expediently, the push rods at the first end have a bearing cup and the mirror support plate has bearing balls, wherein each bearing ball is positioned in one of the bearing cups.

Preferably, the push rods and the bearing cups at the second end are a unitary part.

Advantageously, the first end of the push rods has a first elastic stay with which first elastic stay the push rods are connected to the mirror support plate. Preferably, the first elastic stay is perpendicular to the mirror support plate. Advantageously, the first end of the push rods has a second elastic stay connected between the first elastic stay and a body of the push rods, whereby the second elastic stay is positioned perpendicular to the first elastic stay. Preferably, the second elastic stay is perpendicular to the mirror support plate.

Preferably, the first elastic stays are positioned in a vertical plane and the second elastic stays are positioned in a horizontal plane.

Advantageously, the first end of the push rods further has an intermediate member connected between the first and the second elastic stays. The intermediate member is perpendicular to the first and the second elastic stays. Preferably, the intermediate member is stay-shaped. Advantageously, the intermediate member is non-elastic.

Expediently, the first and the second elastic stays are elastically deformable in two directions that are perpendicular to one another.

In a preferred embodiment of the present invention, the pivot joint is comprised of spring parts that are elastically deformable in two directions that are perpendicular to one another. The spring parts are preferably arranged in planes that are perpendicular to one another. The spring parts are preferably stay-shaped.

Advantageously, the pivot joint further comprises a ring to which ring the spring parts are connected with one end thereof. Advantageously, the ring and the spring parts are a unitary part. Expediently, the spring parts are positioned at the ring at an angular spacing of 90°. Advantageously, the spring parts are positioned in radial planes of the ring.

Preferably, four of the aforementioned spring parts are connected to the ring. In this embodiment, two of the spring parts are diametrically opposite one another and are connected to the mirror support plate, while the other two of the spring parts are diametrically opposite one another and are connected to the housing. Preferably, the two spring parts connected to the mirror support plate are positioned in a horizontal radial plane of the ring. Advantageously, the housing comprises a frame and a holder connected to the frame. The other two spring parts in this embodiment are connected to the holder.

Preferably, the holder and the other two spring parts are formed as a unitary part. The holder preferably extends through the ring. Advantageously, the spring parts extend radially outwardly at a slant.

In the inventive external rearview mirror the pushrods with the bearing cups are pivotably supported on a transverse rod of the intermediate lever. The bearing cups can be attached to the push rods in a simple and inexpensive manner. Furthermore, the push rods can be easily installed with their bearing cups.

DESCRIPTION OF PREFERRED EMBODIMENTS

The present invention will now be described in detail with the aid of several specific embodiments utilizing FIGS. 1 through 12.

The external rearview mirror of the present invention is proposed for vehicles, especially for motorized vehicles, and comprises a mirror support plate 3 which can be adjusted from the interior of the vehicle in the horizontal as well as in the vertical plane about axes that are perpendicular to one another. The external rearview mirror is provided with a mirror base 1 that is connected in a manner known per se to the body of the vehicle. The mirror housing 2 is preferably connected to the base 1 such that it can be folded in and counter to the direction of travel of the vehicle. Such a folding arrangement for external rearview mirrors is known per se and will not be discussed in further detail. The mirror support plate 3 is located within the mirror housing 2 and is connected with a pivot joint 5 in the form of a ball joint with a support 4 that is fixedly connected to the mirror housing 2. The support 4 has a ball 6 on which the bearing cup 7 of the support plate 3 rests. The bearing cup 7 and the mirror support plate 3 are preferably a unitary part. The bearing cup 7 is surrounded at a distance at least partially by a ring 8 which is also preferably a unitary part of the mirror support plate 3.

The mirror base 1 is provided with a bearing cup 9 in which a ball 10 is positioned which is part of an actuating lever 11, whereby the ball 10 is preferably a unitary part of the actuating lever 11. The actuating lever 11 extends into the interior of the vehicle and is provided with a handle, not represented in the drawing, with which a passenger in the vehicle can adjust the mirror support plate 3 in a manner that will be explained in detail infra. The actuating lever 11 is in the form of a two-armed lever having two arms 12 and 13 positioned at an obtuse angle relative to one another. The inner arm 13 extends from the ball 10 through the base 1 into the interior of the mirror housing 2. At its free end the arm 13 is provided with a catch 14 to which an intermediate lever 15 is pivotably connected. The catch 14 has two arms 16 and 17 connected by a connecting piece 18 that has a U-shaped cross-section. The free ends of the arms 16, 17 diverge relative to one another. One end of the intermediate lever 15 is interlocked in this connecting piece 18. When the mirror housing 2 is folded relative to the mirror base 1, the intermediate lever 15 disengages the catch 14. When the mirror housing 2 is returned into the operating position according to FIG. 1, the intermediate lever 15 is automatically returned into the interlocked position due to the diverging arms 16 and 17 of the catch 14.

The intermediate lever 15 is supported such within the connecting piece 18 of the catch 14 that it can pivot relative to the catch 14 about an axis 19 that, relative to the center position of the support plate 3 represented in FIG. 1, extends perpendicular to the paper plane.

The intermediate lever 15 is advantageously provided at half its length with a bearing cup 20 in which a ball 21 is rotatably supported which is provided at the support 4. Preferably, the ball 21 is a unitary part of the support 4. The intermediate lever 15 extends through an opening 22 within the support 4 that with one wall of its frame 23 abuts at the side wall of the mirror housing 2.

The ball 21 of the support 4 is provided at the frame 23. The catch 14 of the actuating lever 11 is positioned at the side of the frame which is facing the mirror base 1. The end of the intermediate lever 15 which is opposite the catch 14 is connected to two push rods 24 and 25 (FIGS. 3 and 4) which in turn are connected to the back wall of the mirror support plate 3. The two pushrods 24, 25, when viewed in the direction of pivot axis 19 of the intermediate lever 15, are positioned congruent to one another when the mirror support plate 3 is in its central position (FIG. 1).

The intermediate lever 15 is provided with a transverse element or rod 26 (FIG. 3) at its end facing away from the catch 14. The transverse rod 26 is spaced at a distance from the mirror support plate 3 and is provided with bearing balls 27 and 28 at its upper and lower ends. Both bearing balls 27, 28 are preferably a unitary part of the transverse rod 26 that is also advantageously a unitary part of the intermediate lever 15. The intermediate lever 15 may have the same height and the same width as the transverse rod 26. However, it is also possible to embody the intermediate lever 15 as a relatively thin arm from which the transverse rod 26 extends at a right angle.

The two push rods 24 and 25 are supported with a bearing cup 29 and 30 on the bearing balls 27, 28 of the transverse rod 26. The bearing cup 29 of the push rod 24 is placed from the top onto the bearing ball 27, while the bearing cup 30 of the lower push rod 25 encloses with from the bottom the bearing ball 28.

The backside of the mirror support plate 3 is provided with two bearing balls 31 and 32 positioned one atop the other (FIG. 3). Preferably, the bearing balls 31, 32 are a unitary part of the mirror support plate 3. The bearing balls 31 and 32 extend with a portion of their diameter past the backside of the mirror support plate 3 and are positioned in the area of the openings 33, 34 of the mirror support plate 3. The upper push rod 34 is positioned with its bearing cup 35 on the upwardly extending bearing ball 31. The bearing ball 32 extends downwardly and supports the bearing cup 36 at the other end of the lower push rod 25 which is pushed from the bottom onto the bearing ball 32. In this manner, the two pushrods 24, 25 are supported in a pivotable manner with their bearing cups 29, 30 and 35, 36 on the bearing balls 27, 28 and 31, 32. As shown in FIG. 1, the bearing balls 31, 32 of the mirror support plate 3 are positioned at a distance from the pivot joint 5 on the side facing the mirror base 1.

FIG. 1 shows the mirror support plate 3 with the mirror 37 in a neutral, respectively, central position. In this position the mirror 37 extends vertical direction as well as perpendicularly to the longitudinal axis of the push rods 24, 25. By pivoting the actuating lever 11 about an axis 38 that is parallel to the pivoting axis 19 extending through the center point of the bearing ball 10, the mirror support plate 3 can be pivoted into the position represented in FIG. 2 from the center position of FIG. 1. Due to the arrangements of the arms 12 and 13 of the actuating lever 11 to the right and left of the bearing ball 10, such a pivot movement results in a pivoting of the intermediate lever 15 in the opposite direction about a pivot axis 39 that is parallel to the pivot axis 38 which extends through the center of the bearing ball 21. With the push rods 24, 25 the mirror support plate 3 is thus pivoted into the corresponding position. The pivot axis 30 of the mirror support plate 3 extends through the center of the ball 6 of the pivot joint 5. The intermediate lever 15 and the mirror support plate 3 pivot relative to the push rods 24 and 25 with which they are pivotably connected in the aforedescribed manner.

Figure 2:
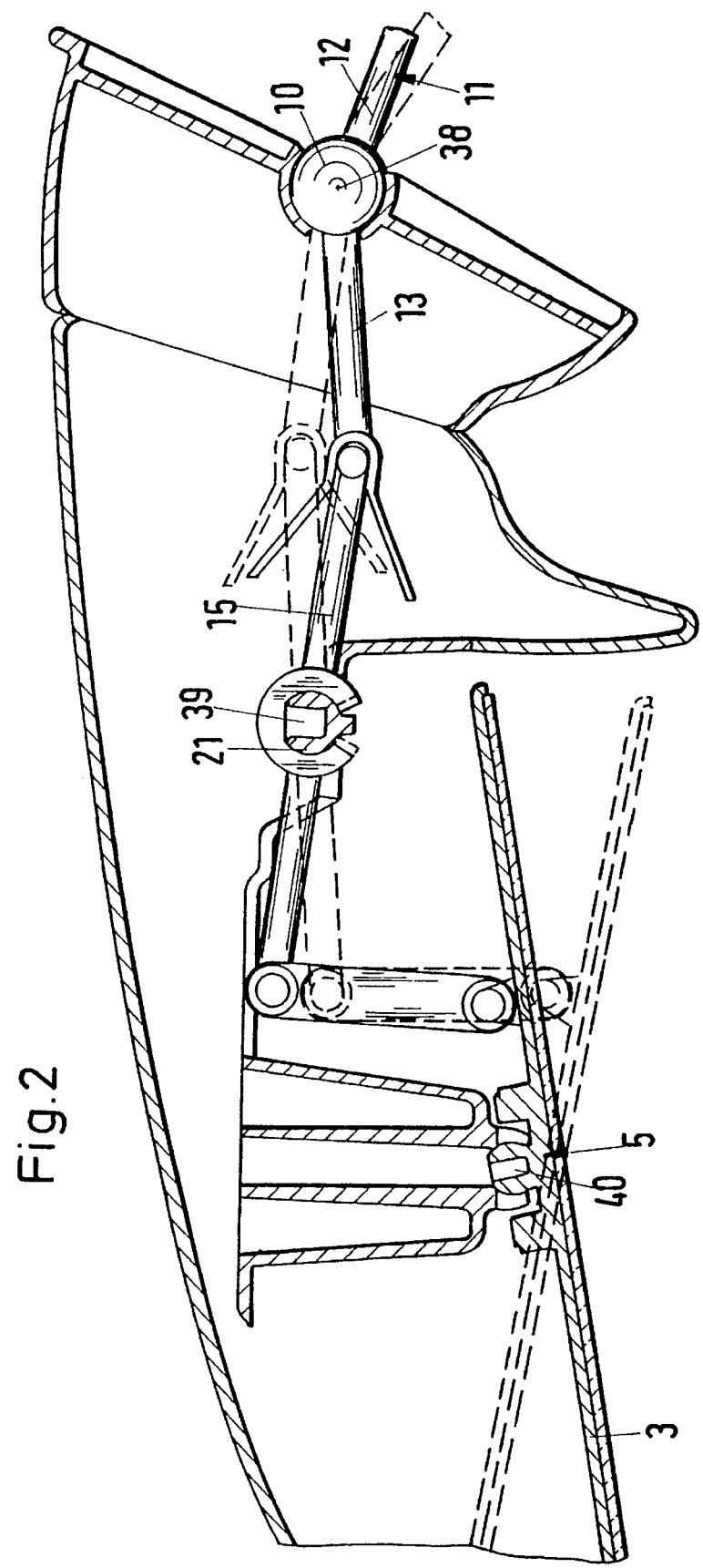
FIG. 2 shows in a representation corresponding to FIG. 1 the exterior rear view mirror with its mirror support plate pivoted about a vertical axis.

In FIG. 2 the position of the adjusting device that results when the actuating lever is pivoted counter to a clockwise direction about the axis 38 is represented in solid lines. When the actuating lever 11 is pivoted about the vertical axis 38 in a clockwise direction (dash-dotted line in FIG. 2), the intermediate lever 15 is correspondingly pivoted counterclockwise about the axis 39. Thus, the push rods 24, 25 are correspondingly displaced and the support plate 3 is tilted about the axis 40 in the other direction.

Due to the ball joint connection of the push rods 24, 25 with the intermediate lever 15 and the mirror support plate 3, it is possible to pivot the mirror support plate 3 not only about the vertical but also about an imaginary horizontal axis. FIG. 3 shows the initial position of the support plate 3 corresponding to FIG. 1. The two push rods 24, 25 in this position are congruent to one another. In order to be able to pivot the mirror support plate 3 into the slanted position according to FIG. 4, the actuating lever 11 (FIGS. 1 and 2) with its ball 10 is rotated in the bearing cup 9 of the mirror base 1. With the catch 14 the intermediate lever 15 is thus also rotated with its bearing cup 20 on the ball 21 of the support 4. As shown in FIG. 1, the intermediate lever 15 is supported within the connecting piece 18 of the catch 14 with a transverse part 41 that extends perpendicular to the longitudinal direction of the pivot arm 15. Via this transverse piece 41 the intermediate lever 15 is entrained by the catch 14 when the described rotational movement of the actuating lever 11 takes place.

Due to the rotational movement of the intermediate lever 15, the transverse rod 26 is pivoted about an axis 42 that is positioned transverse to it. Depending on the pivoting movement of the transverse rod 26 the mirror support plate 3 is pivoted backward (solid lines in FIG. 4) or forward (dash-dotted line in FIG. 4). This pivot movement is possible because the push rods 24, 25 are supported with the bearing cups 29, 30, 35, 36 on the bearing balls 27, 28, 31, 32.

Due to the described ball-joint-type bearing the mirror support plate 3 can be adjusted in any desired slanted and pivoted position. In the described embodiment the mirror support plate 3 is mechanically pivoted via the push rods 24, 25, the intermediate lever 15, and the actuating lever 11.

Due to the displaced pivot axis a spacial displacement of the mirror support plate is achieved in a constructively simple manner.

FIGS. 5 to 8 show an embodiment in which the push rods 24a, 25a are connected to the support plate 3 not with ball joints, but with a special hinge-type pivot Joint 43, 44. While in the previous embodiment the two ends of the push rods each had a bearing cup, only one end of the push rods 24a, 25a is provided with a bearing cup 29a, 30a resting respectively on the bearing balls 27 and 28 of the transverse element 26 of the intermediate lever 15. As disclosed in the previous embodiment, the push rods 24a, 25a are preferably provided with the bearing cups 29a, 30a in a unitary construction and are made of plastic. The hinge-type pivot joint 43, 44 is also advantageously a unitary part of the respective push rod 24a, 25a. Since only on one end of the pushrods 24a, 25a is provided with a bearing cup 29a, 30a, assembly and tool costs can be reduced.

The two hinges 43 and 44 are each comprised of two thin stays 45, 46 and 47, 48 which extend perpendicular to one another and are connected to the body of the push rods. These stays 45 to 48 are advantageously a unitary part of the push rods 24a, 25a. In the embodiment shown, the stays 45 to 48 are also a unitary part with an adjustment plate 49 that is positioned at the backside of the mirror support plate 3. This adjustment plate 49 may, for example, be glued to the mirror support plate 3. It is, however, also possible to embody the stays 45 to 48 as a unitary part of the mirror support plate 3. In this case, an additional connecting element, such as the adjustment plate 49, is not needed. The push rods 24a, 25a, the stays 45 to 48, and the adjustment plate 49 or the mirror support plate 3 may be molded inexpensively and in a simple manner from plastic material. This further reduces tool and assembly costs.

The stays 45 to 48 which are positioned at a right angle relative to one another are also elastically deformable so that for the adjustment of the mirror support plate 3 the required movements can be performed.

In the basic position represented in FIGS. 5 and 7 the mirror support plate 3 is again vertical and perpendicular to the direction of travel F of the vehicle (FIG. 5). In this position the stays 46, 48 which are connected to the adjustment plate 49 extend vertically (FIGS. 5 and 7). The stays 46, 48 extend perpendicular to the adjustment plate 49 and are positioned in the longitudinal center plane of the corresponding push rod 24a, 25a. As can be seen in FIGS. 5 and 7, the vertical stays 46, 48 have a perpendicularly extending intermediate member 50, 51 connected thereto that is parallel to the backside of the adjustment plate 49 and has the same width as the push rods 24a, 25a. The stay 46, 48 and the intermediate member 50, 51 have the same height as can be seen in FIG. 7.

On the side of the intermediate members 50, 51 opposite to the stays 46, 48, the stays 45, 47 are positioned. The stays 45, 47 are perpendicular to the intermediate members 50, 51 as well as to the stays 46, 48. The stays 45, 47 are positioned at half the height of the intermediate members 50, 51 and have the same width as the intermediate members 50, 51. The intermediate members 50, 51 are connected with the stays 45, 47 to the end pieces 52 and 53 of the body of the push rods 24a, 25a. The end pieces 52 and 53 extend parallel to the intermediate members 50, 51. The end pieces 52, 53, however, are thicker than the intermediate members 50, 51 and accordingly provide a sufficient resilience to the push rods 24a, 25a without impairing the elastic deformability of the stays 45 to 48. The stays 45 and 46, respectively, 47 and 48 are functionally separated by the intermediate pieces 50, 51 so that the two stays of each push rod 24a, 25a are independently elastically deformable.

The external rearview mirror according to FIGS. 5 to 8 is substantially identical to the embodiment of FIGS. 1 to 4 with the exception of the aforedescribed differences.

Figure 6:
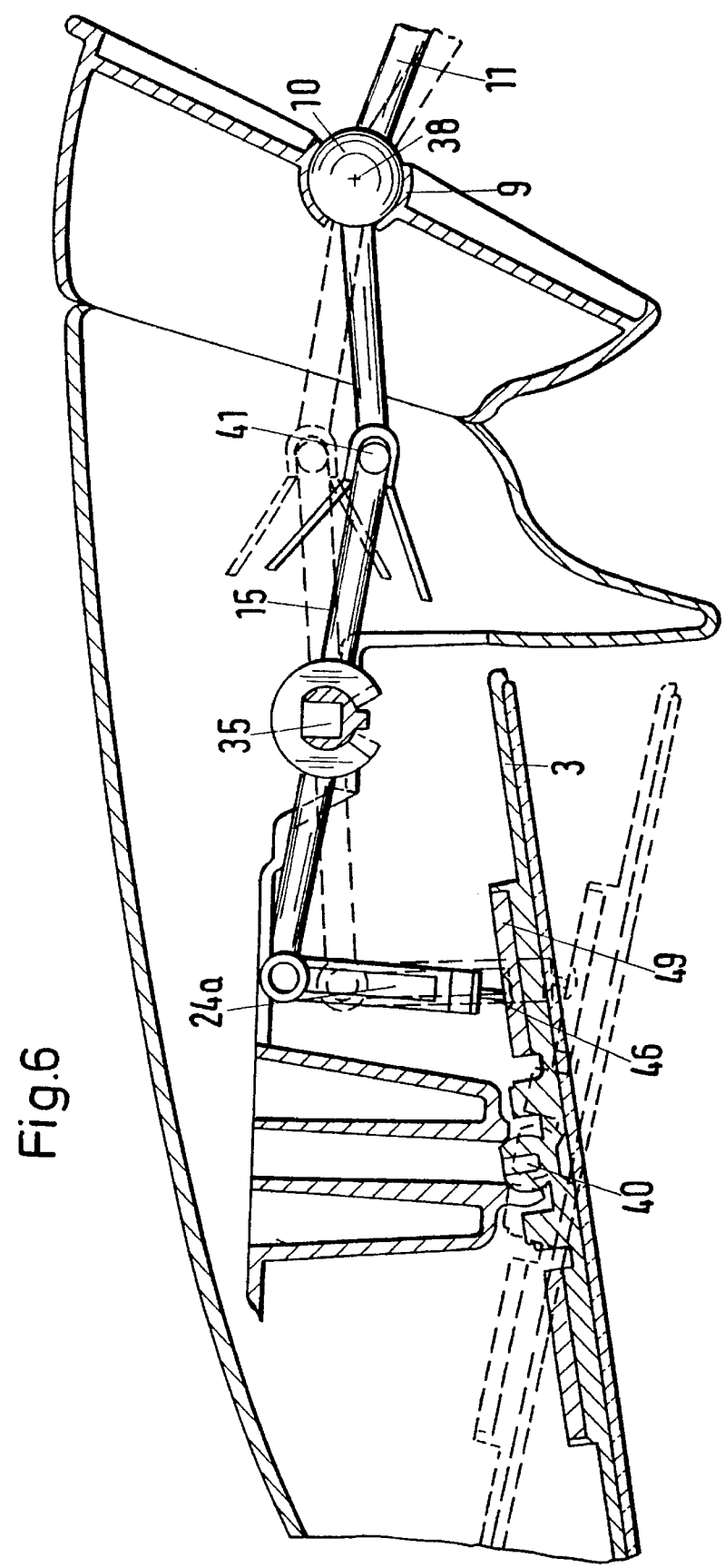

When the actuating lever 11 (FIG. 5) is pivoted about the axis 38 (FIG. 6), the intermediate lever 15 is pivoted in the opposite direction with respect to the actuating lever in the aforedescribed manner. When the actuating lever, as represented in FIG. 6 with a solid line, is pivoted from its neutral position shown in FIG. 5 counter to the clockwise direction, the intermediate lever 15 is pivoted about the axis 38 in the clockwise direction. The pushrod 24a, 25a are then entrained whereby the pushrods 24a, 25a with the bearing cups 29a, 30a, are pivoted relative to the intermediate lever 15. Simultaneously, the mirror support plate 3 is pivoted about the axis 40. Due to the connection of the stays 46 and 48 of the push rods 24a, 25 to the adjustment plate 49 the stays 46 and 48 are elastically deformed. The intermediate members 50 and 51 receive the deformation forces and prevent their transmission to the stays 45 and 47.

When the actuating lever 11 is rotated from the neutral position in FIG. 1 in the clockwise direction, the intermediate lever 15 is pivoted counterclockwise about the axis 38 (dashed lines in FIG. 6). In this case the mirror support plate 3 is pivoted with the push rods 24a, 25a into the position represented in dashed lines in FIG. 6. The stays 46 and 48 are elastically deformed in the other direction in this case.

The actuating lever 11 can also be rotated with its ball joint 9, 10. The intermediate lever 15 is then entrained in the aforedescribed manner via the transverse piece 41. Depending on the direction of rotation (dashed and solid lines in FIG. 8), the mirror support plate 3 is then slanted forward or backward. As in the first embodiment, the push rods 24a, 25a are correspondingly displaced and pivoted. Depending on the slant of the mirror support plate 3, the stays 45 and 47 are elastically deformed in a downward or upward direction while the push rods 24a, 25 at the other end are rotated with their bearing cups 29a, 30a on the bearing balls 27 and 28 of the transverse rod 26 of the intermediate lever 15. The deformation forces are received by the intermediate pieces 50, 51 and the end pieces 52 and 53.

The mirror support plate 3, of course, can also be simultaneously displaced relative to the horizontal and the vertical so that the mirror support plate 3 can be positioned in any desired position. In this case, the two stays 45 and 46 as well as 47 and 48 are simultaneously elastically deformed. Since the intermediate members 50, 51, which are perpendicular to both stays 45 and 46, respectively, 47 and 48, are located between them, the two stays on each side of the intermediate members are not influenced by one another so that the mirror support plate 3 can be precisely adjusted in the desired position.

The embodiment according to FIGS. 9 to 12 is similar to the previously described embodiments. However, the ball Joint 5 is replaced by a pivot joint 54 that is preferably made of plastic. Advantageously, the pivot joint 54 is a unitary part of the adjustment plate 49 which is connected to the backside of the mirror support plate 3. The pivot joint 54 may also be a unitary part of the mirror support plate 3.

The pivot joint 54 has a ring 55 which is positioned at a distance from the adjustment plate 49 and which has advantageously a circular shape. Over its circumference the ring is provided with four stays 56 to 59 (FIG. 9 and FIG. 11) which are spaced at an angular distance of 90°. The diametrically opposed stays 56 and 57, respectively, 58 and 59 are positioned in a diametrical plane of the ring 55. The stays 56 and 57 are positioned in a plane which is perpendicular to the direction of travel F, while the stays 58 and 59 are positioned in a plane which extends in the direction of travel F. The stays 56 to 59 extend at a slant radially outwardly from the ring 55.

Figure 9:
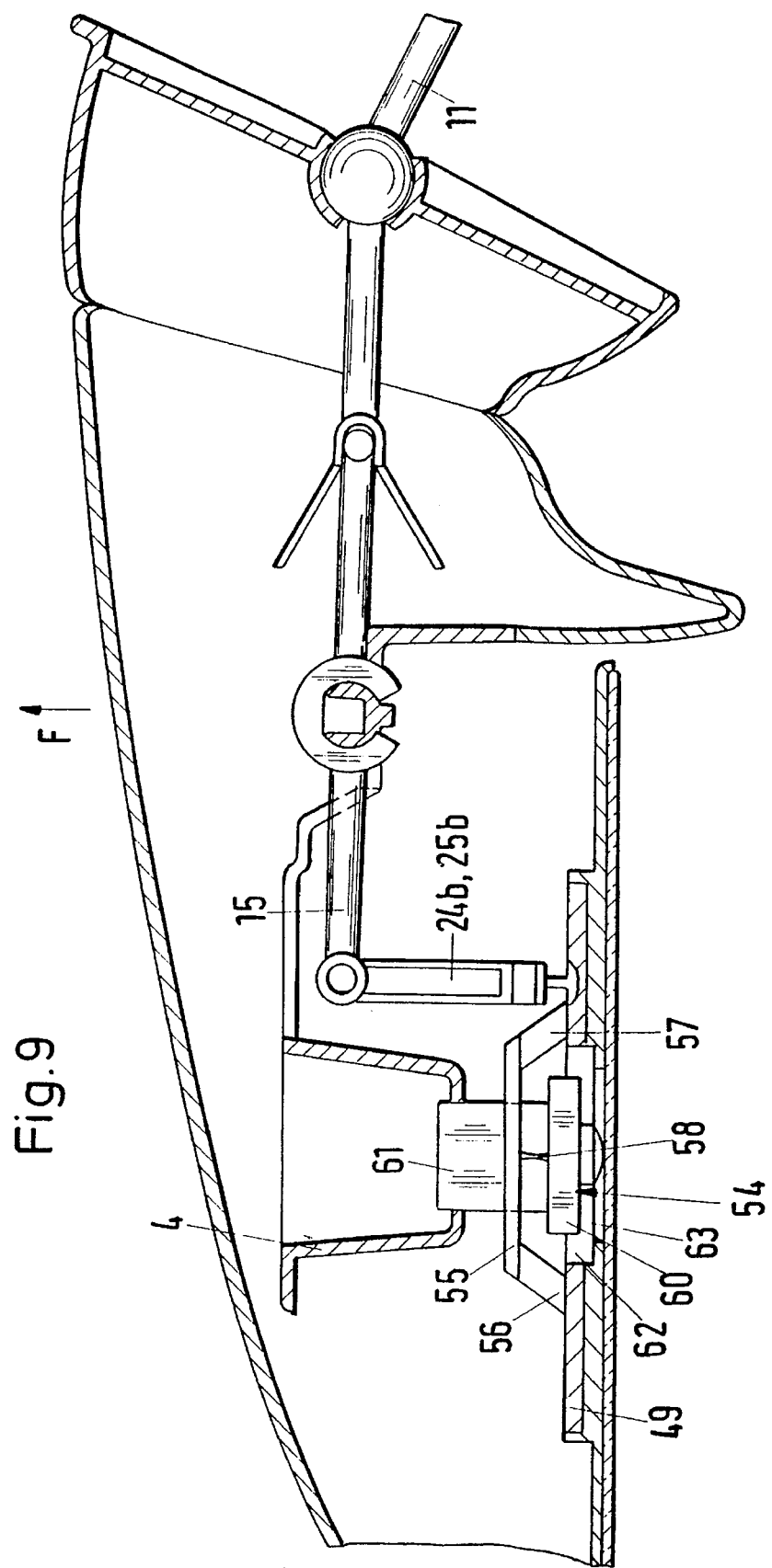
FIGS. 9 to 12 show in representations corresponding to FIGS. 1 to 4 a third embodiment of the inventive external rearview mirror.
Figure 10:
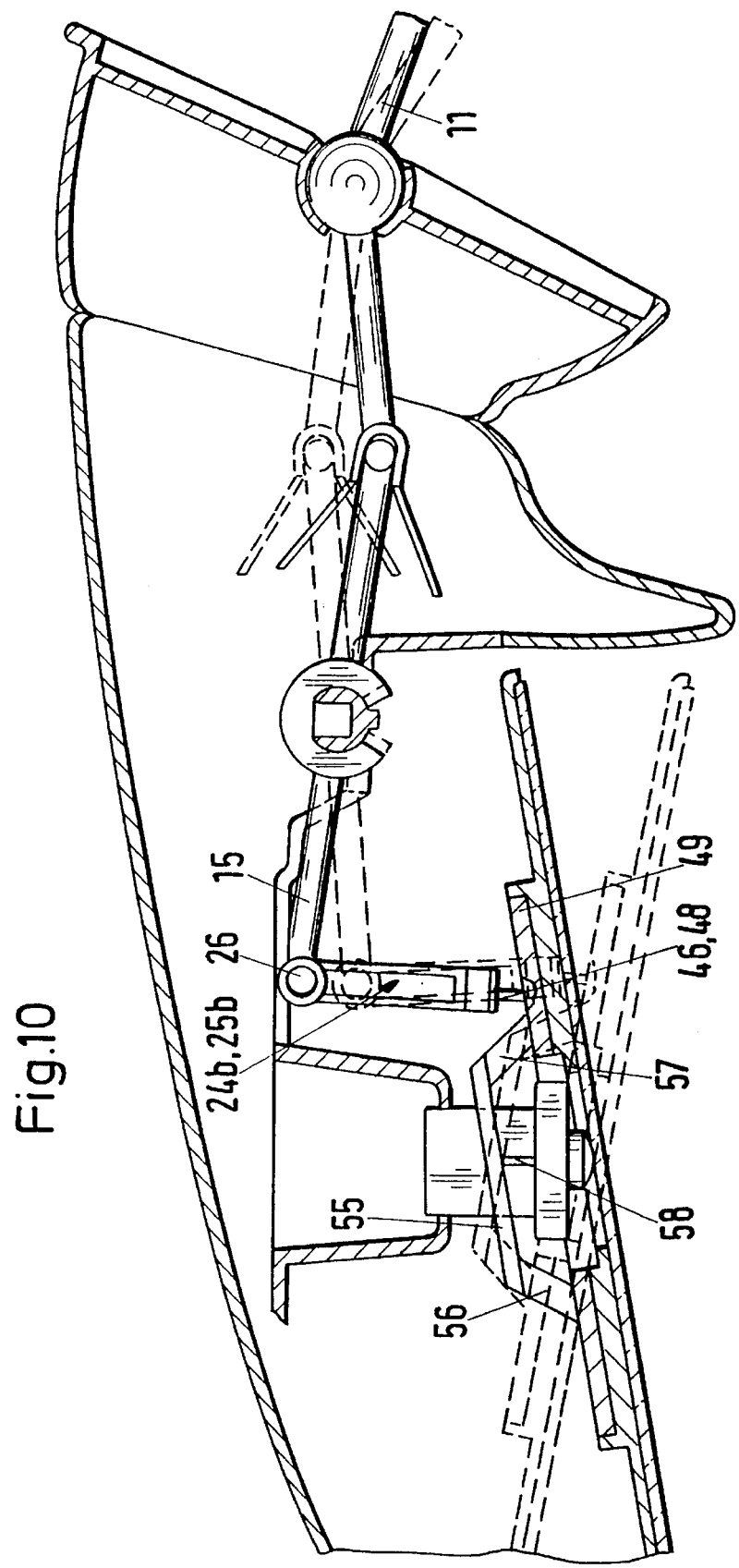

The stays 56 and 57 are connected to the backside of the adjustment plate 49, while the stays 58 and 59 are connected to the head 60 of a holder 61 (FIG. 9). The holder 61 is fixedly connected to the support 4 which is part of the structure of the mirror housing 2. The head 60 extends through the opening 62 within the adjustment plate 49 into a recess 63 within the backside of the mirror support plate 3.

The four stays 56 to 59 are elastically deformable and can be deformed transverse to their longitudinal extension. The ring 55 is nonelastic and receives the forces resulting from the elastic deformation of the stays 56 to 59.

In order to achieve a high stability, the radial width of the ring 55 is greater than its thickness.

The mirror support plate 3 can be adjusted in various positions with the push rods 24b, 25b which are identical to the embodiment described above, when the actuating lever 11 is correspondingly pivoted or rotated. Upon rotation or pivoting of the actuating lever 11, the stays of the push rods 24b, 25b that extend at a right angle relative to one another are elastically deformed in the manner described for the second embodiment of the invention. In addition, the stays 56 to 59 of the joint 54 are also elastically deformed.

Figure 11:
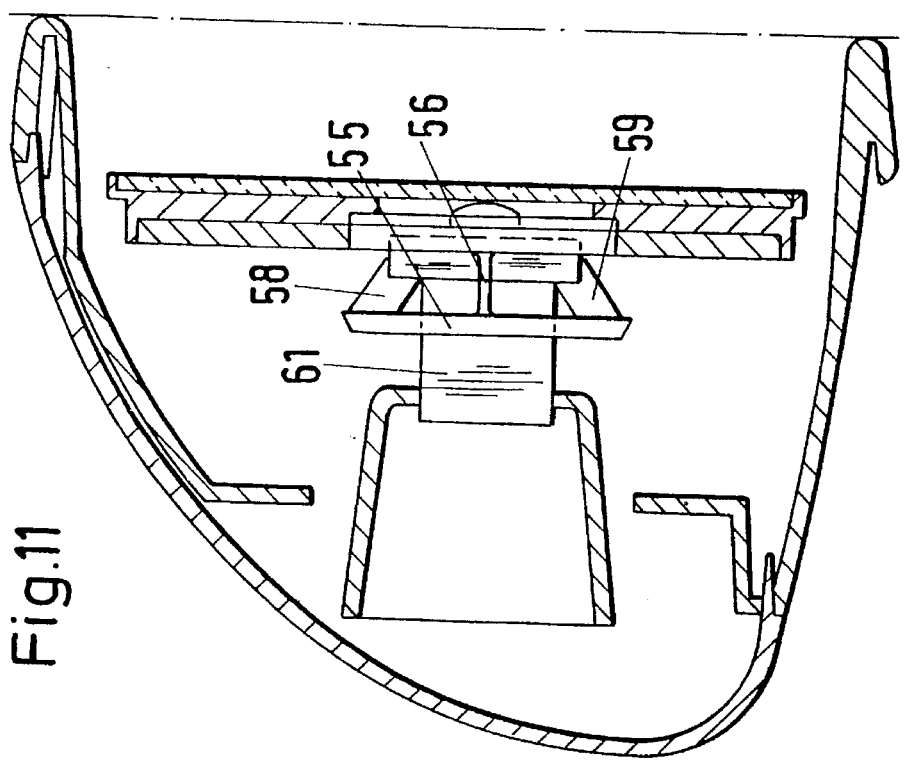

In the representation according to FIGS. 9 and 11, the mirror support plate 3 is shown in its neutral position in which the mirror support plate 3 is perpendicular to the direction of travel F and extends substantially vertically. When the actuating lever 11 is pivoted in the aforedescribed manner, the mirror support plate 3 is pivoted about an imaginary vertical axis of the pivot joint 54 into the position represented in solid and dashed lines in FIG. 10, depending on the pivoting direction of the actuating lever 11. Upon such a pivoting movement the stays 58 and 59 are elastically deformed while the stays 56 and 57 perpendicular thereto remain undeformed.

During this pivoting movement, as described above, the stays 46, 48 of the push rods 24b, 25b connected to the adjustment plate 49 are also elastically deformed.

Figure 12:
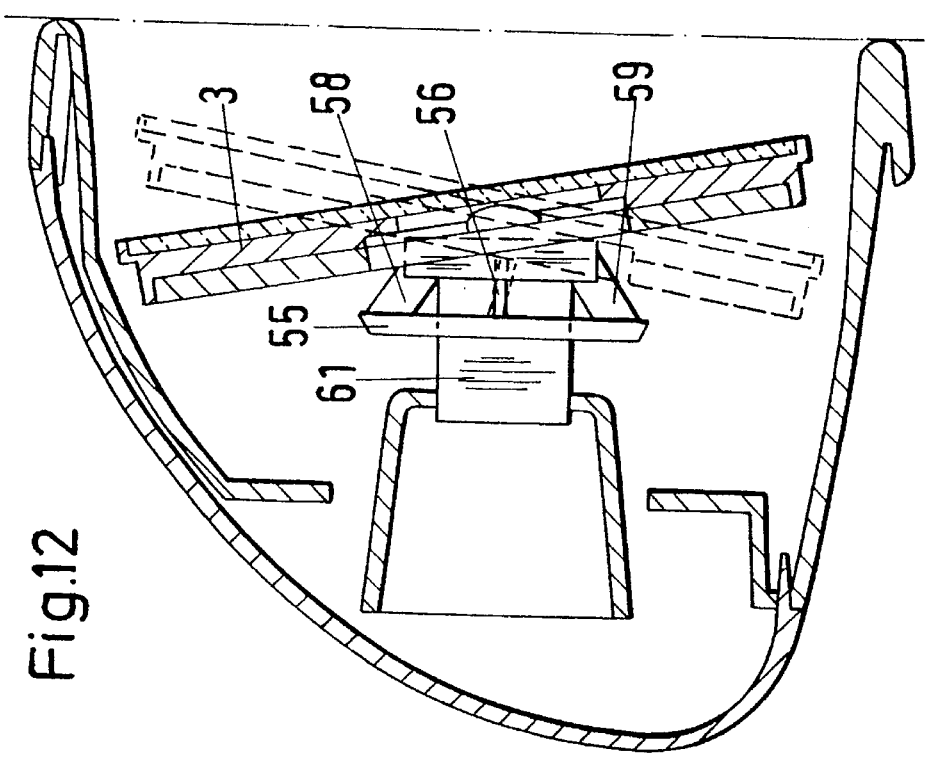

As described in connection with the aforementioned embodiments, the mirror support plate 3 may also be adjusted with respect to its slant (FIG. 12). For this purpose, the actuating lever 11 is correspondingly rotated so that in the aforementioned manner the intermediate lever 15 is rotated. This results in the transverse rod 26 of the intermediate lever 15 being tilted so that the push rods 24b, 25b connected to both ends of this transverse rod are displaced relative to one another. In this manner, the mirror support plate 3 is adjusted with respect to its slant. In this case the stays 56, 57 which are positioned in the horizontal plane are elastically deformed. The resulting deformation forces are reliably received by the ring 55 which is penetrated by the holder 61.

When the mirror support plate 3 is simultaneously adjusted vertically and horizontally, all stays 56 to 59 are elastically deformed.

In all of the aforementioned embodiments the intermediate lever 15 is connected with the two push rods 24, 25; 24a, 25; 24b, 25b to the mirror support plate 3 either directly or via the adjustment plate 49 or a similar part. In the neutral position of the mirror support plate 3, in which it is vertical and perpendicular to the direction of travel F, the push rods extend from their connecting location at the mirror support plate 3 perpendicular to the intermediate lever 15. When the intermediate lever 15 is actuated by the actuating lever 11, the connecting points of the push rods at the intermediate lever 15 are moved on a circular path. When the push rods 24a, 24a; 24b, 25b are connected to the mirror support plate 3, respectively, the adjustment plate 49 with flat stays, these stays, since they are rigidly connected with a mirror support plate or its adjustment plate, are elastically deformed in the aforedescribed manner.

The present invention is, of course, in no way restricted to the specific disclosure of the specification and drawings, but also encompasses any modifications within the scope of the appended claims.

What I claim is:

1. An external rear view mirror for a motor vehicle, said mirror comprising:

a housing;

a mirror support plate;

a pivot joint for connecting said mirror support plate to said housing such that said mirror support plate is pivotable about two axes perpendicular to one another;

an actuating lever for pivoting said mirror support plate;

two push rods pivotably connected with a first end to said mirror support plate at a distance from said pivot joint;

an intermediate lever pivotably connected to said actuating lever and to said push rods;

said intermediate lever having a transverse rod with two ends in the form of a bearing ball;

said push rods having at a second end thereof a bearing cup, with each of said bearing balls resting in one of said bearing cups; and wherein said intermediate lever has two arms and a ball joint for connecting said two arms to one another.

2. An external rear view mirror according to claim 1, wherein said transverse rod is connected to an end of said intermediate lever opposite said actuating lever.

3. An external rear view mirror according to claim 1, wherein said push rods at said first end have a bearing cup and wherein said mirror support plate has bearing balls, each said bearing ball positioned in one of said bearing cups.

4. An external rear view mirror according to claim 1, wherein said push rods and said bearing cups at said second end are a unitary part.

5. An external rear view mirror according to claim 1, wherein said pivot joint is comprised of spring parts that are elastically deformable relative to one another in two directions that are perpendicular to one another.

6. An external rear view mirror according to claim 5, wherein said spring parts are arranged in planes that are perpendicular to one another.

7. An external rear view mirror according to claim 5, wherein said spring parts are stays.

8. An external rear view mirror according to claim 5, wherein said pivot joint further comprises a ring to which said spring parts are connected with one end thereof.

9. An external rear view mirror according to claim 8, wherein said ring and said spring parts are a unitary part.

10. An external rear view mirror according to claim 8, wherein said spring parts are positioned at said ring at an angular spacing of 90°.

11. An external rear view mirror according to claim 8, wherein said spring parts are positioned in radial planes of said ring.

12. An external rear view mirror according to claim 8, wherein said spring parts extend radially outwardly from said ring at a slant to a radial plane of said ring.

13. An external rear view mirror for a motor vehicle, said mirror comprising:

a housing;

a mirror support plate;

a pivot joint for connecting said mirror support plate to said housing such that said mirror support plate is pivotable about two axes perpendicular to one another;

an actuating lever for pivoting said mirror support plate;

two push rods pivotably connected with a first end to said mirror support plate at a distance from said pivot joint;

an intermediate lever pivotably connected to said actuating lever and to said push rods;

said intermediate lever having a transverse rod with two ends in the form of a bearing ball;

said push rods having at a second end thereof a bearing cup, with each of said bearing balls resting in one of said bearing cups; and wherein each one of said first ends of said push rods has a first elastic stay, wherein said push rods are connected to said mirror support plate with said first elastic stays.

14. An external rear view mirror according to claim 13, wherein said first elastic stay is perpendicular to said mirror support plate.

15. An external rear view mirror according to claim 14, wherein each one of said first ends of said push rods has a second elastic stay connected between said first elastic stay and a body of each one of said push rods, said second elastic stays positioned perpendicular to said first elastic stays.

16. An external rear view mirror according to claim 15, wherein said second elastic stays are perpendicular to said mirror support plate.

17. An external rear view mirror according to claim 16, wherein said first elastic stays are positioned in a vertical plane.

18. An external rear view mirror according to claim 17, wherein said second elastic stays are positioned in a horizontal plane.

19. An external rear view mirror according to claim 15, wherein each one of said first ends of said push rods further has an intermediate member connected between said first and said second elastic stays.

20. An external rear view mirror according to claim 19, wherein said intermediate member is perpendicular to said first and said second elastic stays.

21. An external rear view mirror according to claim 19, wherein said intermediate member is a stay.

22. An external rear view mirror according to claim 19, wherein said intermediate member is non-elastic.

23. An external rear view mirror according to claim 15, wherein said first and second elastic stays of each one of said push rods are elastically deformable relative to one another in two directions that are perpendicular to one another.

24. An external rear view mirror for a motor vehicle, said mirror comprising:

a housing;

a mirror support plate;

a pivot joint for connecting said mirror support plate to said housing such that said mirror support plate is pivotable about two axes perpendicular to one another;

an actuating lever for pivoting said mirror support plate;

two push rods pivotably connected with a first end to said mirror support plate at a distance from said pivot joint;

each one of said push rods having a second end in the form of a bearing cup; and intermediate lever having a first end and a second end, wherein said first end is pivotably connected to said actuating lever;

a transverse rod connected with a center section thereof to said second end of said intermediate lever so as to extend transversely to said intermediate lever;

said transverse rod having two ends, each one of said two ends being in the form of a bearing ball;

said transverse rod connected to said second ends of said push rods such that each one of said bearing balls rests in one of said bearing cups;

said pivot joint comprised of spring parts that are elastically deformable in two directions that are perpendicular to one another;

said pivot joint further comprising a ring to which ring said spring parts are connected with one end thereof; and four of said spring parts connected to said ring;

two of said spring parts positioned diametrically opposite one another and connected to said mirror support plate; and the other two of said spring parts positioned diametrically opposite one another and connected to said housing.

25. An external rear view mirror according to claim 24, wherein said two spring parts connected to said mirror support plate are positioned in a horizontal radial plane of said ring.

26. An external rear view mirror according to claim 24, wherein:

said housing comprises a frame and a holder connected to said frame; and said other two spring parts are connected to said holder.

27. An external rear view mirror according to claim 26, wherein said holder and said other two spring parts are formed as a unitary part.

28. An external rear view mirror according to claim 26, wherein said holder extends through said ring.

\* \* \* \* \*